(12) United States Patent
Wu

(10) Patent No.: US 12,302,152 B2
(45) Date of Patent: May 13, 2025

(54) METHOD FOR REPORTING FAILURE REPORT OF A NUMBER OF CELLS AND RELATED DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 403 days.

(21) Appl. No.: 17/730,144

(22) Filed: Apr. 26, 2022

(65) Prior Publication Data

US 2022/0256384 A1 Aug. 11, 2022

Related U.S. Application Data

(63) Continuation of application No. PCT/CN2020/126663, filed on Nov. 5, 2020.

(30) Foreign Application Priority Data

Nov. 6, 2019 (CN) .......................... 201911077864.2

(51) Int. Cl.
*H04W 24/10* (2009.01)
*H04L 1/1812* (2023.01)
(Continued)

(52) U.S. Cl.
CPC ........... *H04W 24/10* (2013.01); *H04L 1/1812* (2013.01); *H04W 72/1268* (2013.01); *H04W 74/0808* (2013.01)

(58) Field of Classification Search
CPC ............. H04W 24/10; H04W 72/1268; H04W 74/0808; H04W 74/0825; H04L 1/1812; H04L 1/189
See application file for complete search history.

(56) References Cited

U.S. PATENT DOCUMENTS

2018/0176961 A1* 6/2018 Babaei .............. H04W 74/0833
2022/0123823 A1* 4/2022 Dong ................ H04W 72/1263
(Continued)

FOREIGN PATENT DOCUMENTS

CN 107371168 A 11/2017
CN 108243508 A 7/2018
(Continued)

OTHER PUBLICATIONS

International Search Report issued in corresponding International Application No. PCT/CN2020/126663, mailed Jan. 27, 2021, 4 pages.
(Continued)

*Primary Examiner* — Harry H Kim
(74) *Attorney, Agent, or Firm* — IPX PLLC

(57) ABSTRACT

A method for reporting a failure report and a related device are provided. The method includes: determining reporting signaling in a case that an uplink Listen-Before-Talk (LBT) failure occurs on a terminal in at least one cell; and sending failure information of the at least one cell to a network side based on the reporting signaling. In the method for reporting a failure report, in a case that the LBT failure occurs in the at least one cell, the terminal can quickly report failure information to the network side, so that the network side can restore the uplink LBT failure in a timely manner, to prevent the terminal from continuously triggering a connection reestablishment process.

19 Claims, 5 Drawing Sheets

(51) Int. Cl.
*H04L 1/1867* (2023.01)
*H04W 72/1268* (2023.01)
*H04W 74/0808* (2024.01)

(56) References Cited

U.S. PATENT DOCUMENTS

| | | | | |
|---|---|---|---|---|
| 2022/0217588 A1* | 7/2022 | You | ................ | H04W 36/305 |
| 2022/0225410 A1* | 7/2022 | Turtinen | ................ | H04L 1/188 |
| 2022/0369368 A1* | 11/2022 | Sedin | ................ | H04W 72/23 |
| 2022/0394763 A1* | 12/2022 | Wang | ................ | H04W 74/0808 |

FOREIGN PATENT DOCUMENTS

| | | |
|---|---|---|
| WO | 2018137485 A1 | 8/2018 |
| WO | 2019195465 A1 | 10/2019 |

OTHER PUBLICATIONS

Vivo, "Remaining issues of uplink LBT failure", 3GPP TSG-RAN WG2 Meeting #107bis R2-1912177, Oct. 18, 2019.
OPPO, "Uplink LBT failure recovery for NR-U", 3GPP TSG-RAN WG2 Meeting #107bis R2-1912096, Oct. 18, 2019.
First Office Action issued in related Chinese Application No. 201911077864.2, mailed Jan. 14, 2022, 7 pages.
Second Office Action issued in related Chinese Application No. 201911077864.2, mailed Jul. 29, 2022, 6 pages.
Third Office Action issued in related Chinese Application No. 201911077864.2, mailed Oct. 28, 2023, 8 pages.

* cited by examiner

METHOD FOR REPORTING FAILURE REPORT OF A NUMBER OF CELLS AND RELATED DEVICE

CROSS-REFERENCE TO RELATED APPLICATIONS

This application is a continuation of International Application No. PCT/CN2020/126663, filed on Nov. 5, 2020, which claims priority to Chinese Patent Application No. 201911077864.2, filed on Nov. 6, 2019. The entire contents of each of the above-identified applications are expressly incorporated herein by reference.

TECHNICAL FIELD

The present disclosure relates to the field of wireless communications technologies, and in particular, to a method for reporting a failure report and a related device.

BACKGROUND

With the development of mobile communications technologies, to meet an increasing traffic volume, the Third Generation Partnership Project (3GPP) organization provides an unlicensed band to help a licensed band to provide a communication service, to implement expansion of the communication service.

In a wireless communications system, Listen-Before-Talk (LBT) needs to be performed when data is received/transmitted by using the unlicensed band, that is, a terminal (User Equipment (UE)) monitors, before sending data, whether the unlicensed band is occupied (or idle). If the unlicensed band is not occupied, the terminal may receive/transmit data on the unlicensed band, in other words, LBT succeeds. If the unlicensed band is occupied, the terminal cannot receive/transmit data on the unlicensed band, in other words, LBT fails. In a case that the terminal detects that the LBT fails, the terminal may constantly trigger a connection reestablishment process, thereby reducing data transmission efficiency.

It can be learned that, in a current process of transmitting/receiving data by using the unlicensed band, data transmission efficiency is low.

SUMMARY

Embodiments of the present disclosure provide a method for reporting a failure report and a related device, to resolve a problem that data transmission efficiency is low in a current process of transmitting and receiving data by using an unlicensed band.

To resolve the foregoing problem, the embodiments of the present disclosure are implemented as follows:

According to a first aspect, an embodiment of the present disclosure provides a method for reporting a failure report, applied to a terminal and including:
  determining reporting signaling in a case that an uplink Listen-Before-Talk (LBT) failure occurs on the terminal in at least one cell; and
  sending failure information of the at least one cell to a network side based on the reporting signaling.

According to a second aspect, an embodiment of the present disclosure further provides a method for reporting a failure report, applied to a network side device and including:
  receiving failure information of at least one cell that is sent by a terminal based on reporting signaling.

According to a third aspect, an embodiment of the present disclosure further provides a terminal, including:
  a determining module, configured to determine reporting signaling in a case that an uplink LBT occurs on the terminal in at least one cell; and
  a first sending module, configured to send the failure information of the at least one cell to a network side based on the reporting signaling.

According to a fourth aspect, an embodiment of the present disclosure further provides a network side device, including:
  a first receiving module, configured to receive failure information of at least one cell that is sent by a terminal based on reporting signaling.

According to a fifth aspect, an embodiment of the present disclosure further provides a terminal, including a processor, a memory, and a computer program that is stored in the memory and that can run on the processor, and when the computer program is executed by the processor, steps of the method for reporting a failure report in the first aspect are implemented.

According to a sixth aspect, an embodiment of the present disclosure further provides a network side device, including a processor, a memory, and a computer program that is stored in the memory and that can run on the processor, and when the computer program is executed by the processor, steps of the method for reporting a failure report in the second aspect are implemented.

According to a seventh aspect, an embodiment of the present disclosure further provides a computer-readable storage medium, where the computer-readable storage medium stores a computer program, and when the computer program is executed by a processor, steps of the method for reporting a failure report in the first aspect or the second aspect are implemented.

In the embodiments of the present disclosure, reporting signaling is determined in a case that it is detected that an uplink LBT failure occurs on the terminal in at least one cell, and failure information of the at least one cell is sent to a network side based on the reporting signaling. In this way, in a case that the LBT failure occurs in the at least one cell, the terminal can quickly report the failure information to the network side, so that the network side can restore the uplink LBT failure in a timely manner, to prevent the terminal from continuously triggering a connection reestablishment process, thereby improving data transmission efficiency.

DETAILED DESCRIPTION

Figure 1:
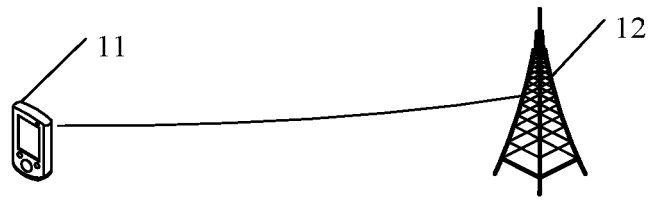
FIG. 1 is a structural diagram of a network system to which an embodiment of the present disclosure is applicable.

Referring to FIG. 1, FIG. 1 is a schematic diagram of a network to which an embodiment of the present disclosure is applicable. As shown in FIG. 1, a terminal 11 and a network side device 12 are included. The terminal 11 may be a terminal side device such as a mobile phone, a tablet personal computer, a laptop computer, a Personal Digital Assistant (PDA), a Mobile Internet Device (MID), or a wearable device. It should be noted that a specific type of the terminal 11 is not limited in the embodiments of the present disclosure. The network side device 12 may be a macro base station, an LTE eNB, a 5G NR NB, or a gNB. The network side device 12 may alternatively be a Low Power Node (LPN) or a small cell such as a pico or a femto, or the network side device 12 may be an Access Point (AP). The network side device 12 may alternatively be a network node including a Central Unit (CU) and a plurality of Transmission Reception Point (TRP) managed and controlled by the central unit. It should be noted that a specific type of the network side device 12 is not limited in this embodiment of the present disclosure.

Figure 2:
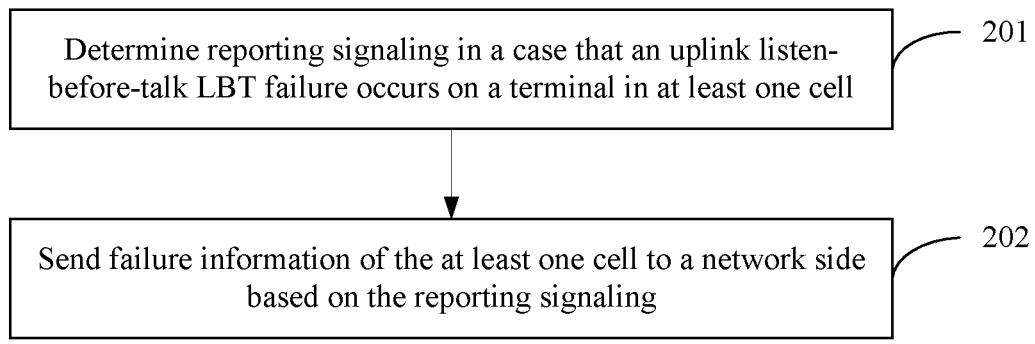
FIG. 2 is a first schematic flowchart of a method for reporting a failure report according to an embodiment of the present disclosure.

Referring to FIG. 2, an embodiment of the present disclosure provides a method for reporting a failure report, applied to a terminal. As shown in FIG. 2, the method for reporting a failure report includes the following steps:

Step 101: Determine reporting signaling in a case that an uplink listen-before-talk LBT failure occurs on the terminal in at least one cell.

Step 102: Send failure information of the at least one cell to a network side based on the reporting signaling.

In this way, in a case that the LBT failure occurs on the terminal in the at least one cell, the terminal sends the failure information of the at least one cell to the network side based on the reporting signaling, so that failure information is quickly reported to the network side. In this way, the network side can restore the uplink LBT failure in a timely manner, to prevent the terminal from continuously triggering a connection reestablishment process, thereby improving data transmission efficiency.

In step 101, when the terminal needs to send and receive data by using an unlicensed band, the terminal performs LBT in at least one cell on the unlicensed band. When the terminal detects that an LBT failure (that is, being occupied) occurs in the at least one cell, the terminal may determine the reporting signaling that is used to report information indicating that the LBT failure occurs in the at least one cell.

Herein, that the terminal determines the reporting signaling may be understood as determining a signaling format of the reporting signaling, that is, determining a specific signaling format of reporting signaling used to report the failure information indicating that the LBT failure occurs in the at least one cell.

In addition, the terminal may establish a connection in both a Master Cell Group (MCG) and a Secondary Cell Group (SCG), and the MCG includes a Primary Cell (PCell) and a Secondary Cell (SCell), and the SCG includes a Primary Secondary Cell (PSCell) and an SCell. The PCell and the PSCell may be referred to as a Special Cell (SpCell). In this embodiment, the at least one cell may be one or at least two SCells.

In this embodiment, the reporting signaling may be any signaling that can be used to send, to the network side, the failure information indicating that the LBT failure occurs in the at least one cell, so that the network side learns, based on the reporting signaling, the failure information indicating that the LBT failure occurs in the at least one cell.

Specifically, the reporting signaling includes first signaling or at least one piece of second signaling, where the first signaling is used to indicate at least one cell in which the uplink LBT failure occurs; and the second signaling is used to indicate one cell in which the uplink LBT failure occurs.

Herein, the terminal may send the failure information of the at least one cell to the network side by using the first signaling or the at least one piece of second signaling, so that a manner in which the terminal sends the failure information of the at least one cell to the network side device is more flexible.

In this implementation, the first signaling may be used to indicate a cell identity of one or at least two cells in which the uplink LBT failure occurs. Specifically, first signaling may carry a cell identity of one or at least two cells in which the uplink LBT failure occurs. For example, the first signaling is a Medium Access Control (MAC) Control Element (CE), where a MAC subProtocol Data Unit including a MAC CE (that is, MAC subPDU including MAC CE) includes a subheader (that is, an R/LCID subheader) and a MAC CE body (that is, a fixed-sized MAC CE), and the MAC CE body includes a cell identity of the at least one cell in which the uplink LBT failure occurs.

Figure 3:
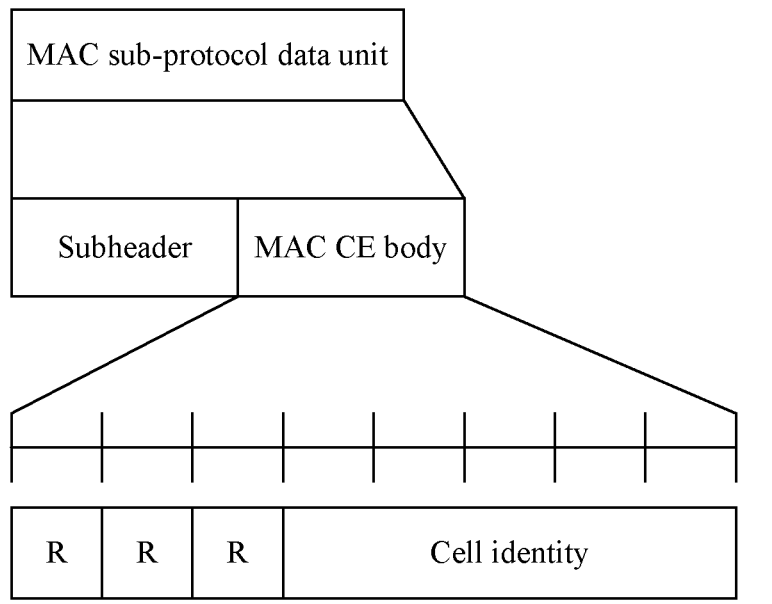
FIG. 3 is a first schematic diagram of reporting signaling according to an embodiment of the present disclosure.

In addition, a byte size occupied by the first signaling may be set based on a quantity of cells in which the LBT failure occurs, as indicated by the first signaling. Specifically, the first signaling includes a cell indicator used to indicate the at least one cell. In a case that a quantity of secondary cells in the at least one cell is less than or equal to 7, a length of the cell indicator may be one byte. For example, a MAC CE shown in FIG. 3 is used to indicate seven SCells, and one cell identity is set for each bit of a byte 1 (Oct 1) in a MAC CE body, and each cell identity is used to indicate that one SCell in which the LBT failure occurs (for example, a cell identity C1 is used to indicate that the LBT failure occurs in an SCell 1).

Figure 4:
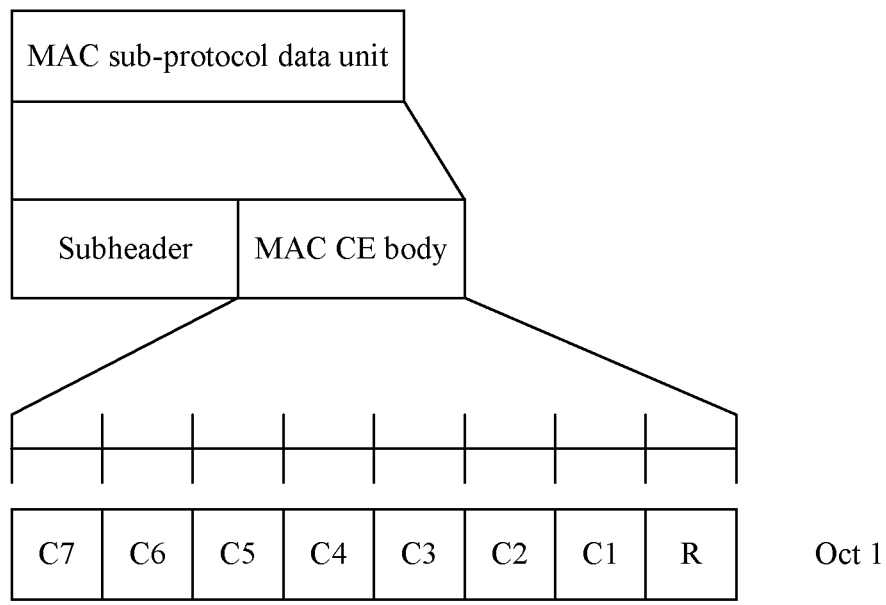
FIG. 4 is a second schematic diagram of reporting signaling according to an embodiment of the present disclosure.

In some embodiments, in a case that a quantity of cells of the at least two cells is greater than 7, a length of the cell indicator may be 4 bytes. As shown in FIG. 4, four bytes (Oct1 to Oct4) in a MAC CE body may indicate a maximum of 31 SCells. Certainly, in a case that a quantity of SCells indicated by the MAC CE is less than 31, the terminal may set some bits in the four bytes to null, that is, no cell identity is set.

In this implementation, the reporting signaling may alternatively include at least one piece of second signaling, and each piece of second signaling is used to indicate only one cell in which the uplink LBT failure occurs. For example, in a case that the LBT failure occurs in the foregoing N cells, the reporting signaling may include N second signaling that is in a one-to-one correspondence with the N cells, each signaling indicates that the LBT failure occurs in a cell corresponding to the signaling, and N is a positive integer.

Figure 5:
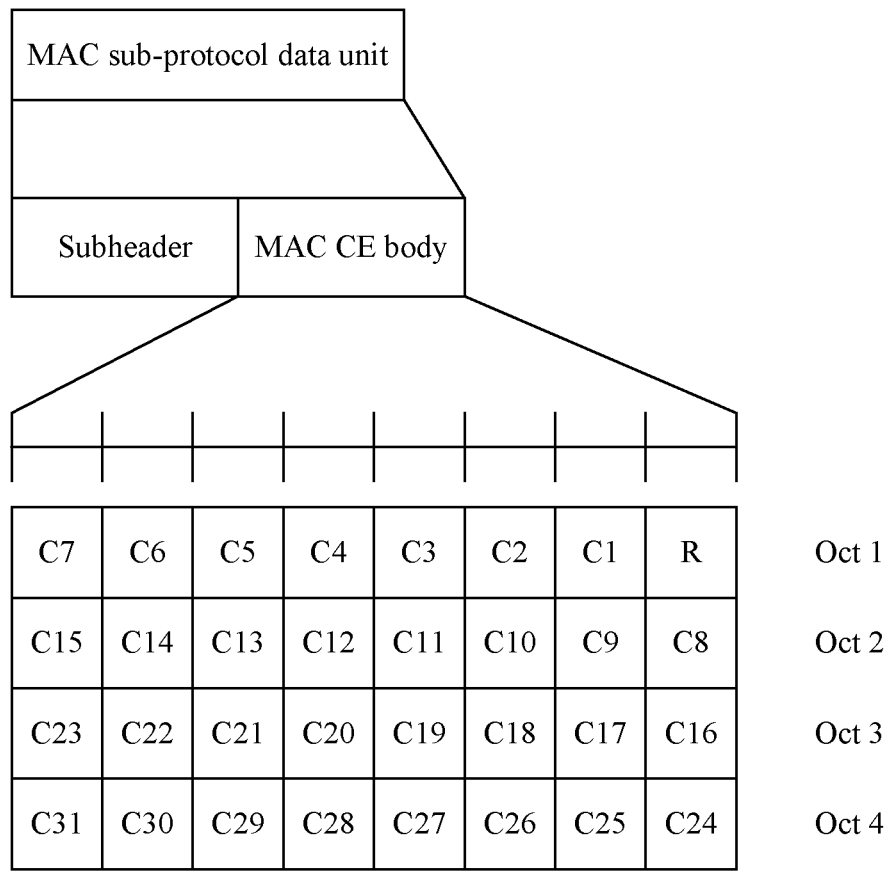
FIG. 5 is a third schematic diagram of reporting signaling according to an embodiment of the present disclosure.

In addition, the second signaling is used to indicate a cell in which the uplink LBT failure occurs, or that the second signaling carries a cell identity of a cell indicated by the second signaling, so that the network side device obtains, based on the carried cell identity, the cell in which the LBT failure occurs. For example, as shown in FIG. 5, the second signaling is a MAC CE, and a cell identity (that is, Cell ID) of a cell is disposed in the MAC CE body. Specifically, the cell identity may be a serving cell identity or a secondary cell identity of the cell, that is, a serving cell identity or a secondary cell identity of the cell.

It should be noted that, in a process of performing LBT in a cell, the terminal may perform LBT on a BandWidth Part (BWP) of the cell. Specifically, if the terminal detects that the LBT failure occurs on one BWP of the cell, the terminal changes an activated BWP of the terminal to another BWP of the cell, and triggers a random access process.

In some implementations, the reporting signaling includes BWP identification information of a first cell, the first cell is any cell in the at least one cell, and the BWP identification information is used to indicate a BWP in the first cell on which the uplink LBT failure occurs. Therefore, not only a cell in which the LBT failure occurs can be indicated, but a BWP on which the LBT failure occurs can also be indicated.

For example, if the uplink LBT failure occurs in a cell 1, and the uplink LBT failure occurs on some or all BWPs in the cell 1, the reporting signaling may include first signaling or second signaling, and indicates the cell 1 by using the first signaling or the second signaling, and the reporting signaling may further include BWP identification information of the cell 1, where the BWP identification information is used to indicate that the BWP in the cell 1 on which the uplink LBT failure occurs.

In this implementation, the BWP identification information is used to indicate that a BWP of the first cell on which the uplink LBT failure occurs, and the BWP identification information is used to indicate some or all BWPs in the first cell on which the uplink LBT failure occurs. Specifically, the BWP identification information is used to:
   indicate all BWPs in the first cell on which the uplink LBT failure occurs; for example, in a case that the uplink LBT failure occurs on both a BWP 1 and a BWP 2 in the cell 1, the BWP identification information may be used to indicate the BWP 1 and the BWP 2; or
   indicate a BWP in the first cell on which the uplink LBT failure occurs for the last time; for example, in a case that the uplink LBT failure occurs on both a BWP 1 and a BWP 2 in the cell 1, if a BWP on which the uplink LBT failure occurs for the last time is the BWP 2 (that is, the uplink LBT failure occurs on the BWP 2 for the last time), the BWP identification information may be used to indicate only the BWP 2; or
   indicate a BWP in the first cell on which the uplink LBT failure occurs for the first time; for example, if the uplink LBT failure occurs on both a BWP 1 and a BWP 2 in the cell 1, and the uplink LBT failure occurs on the BWP 1 first and then the uplink LBT failure occurs on the BWP 2, and an LBT failure still occurs in a process of initiating random access on the BWP 2, that is, the BWP on which the uplink LBT failure occurs for the first time is the BWP 1, the BWP identification information may be used to indicate only the BWP 1.

In some other implementations, it may be agreed on in a protocol that the uplink LBT failure occurs on an activated BWP in the first cell, so that the network side may directly determine, according to the agreement in the protocol, that an activated BWP in a cell in which the uplink LBT failure occurs is a BWP on which the uplink LBT failure occurs, so that no additional BWP identification information needs to be sent, thereby reducing resource overheads of the terminal.

It should be noted that when receiving an uplink grant, the terminal may multiplex data corresponding to different logical channel identifiers based on a data amount that can be carried in the uplink grant, to generate a MAC PDU and send the MAC PDU, and a priority sequence of the data multiplexing is (ranked in descending order as follows):
   a Cell Radio Network Temporary Identity (Cell RNTI, C-RNTI) MAC CE or data from an UpLink Common Control CHannel (data from UL-CCCH);
   a configured grant confirmation MAC CE;
   a MAC CE for a Buffer Status Report, with exception of a Buffer Status Report included for padding (MAC CE for BSR, with exception of B SR included for padding);
   a single Power Headroom Report MAC CE or a Multiple Entry Power Headroom Report MAC CE (Single Entry PHR MAC CE or Multiple Entry PHR MAC CE);
   data from any logical channel other than an uplink common control channel;
   a MAC CE for recommended bit rate query; and
   a MAC CE for B SR included for padding.

In some implementations, a priority of the reporting signaling may be higher than a priority of a data channel, so that the network side can preferentially process the reporting signaling, and the network side can restore the uplink LBT failure in a more timely manner, thereby further improving data transmission efficiency.

In this implementation, that the priority of the reporting signaling may be higher than the priority of the data channel may be being higher than a priority of any data multiplexing in the foregoing data multiplexing priority order. For example, the priority of the reporting signaling may be higher than a priority of data from any logical channel except the uplink common control channel.

In some implementations, the priority of the reporting signaling further meets any one of the following:
   being the same as a priority of a C-RNTI MAC CE;
   being lower than only a priority of a C-RNTI MAC CE; or
   being higher than only a priority of data from any logical channel other than an uplink common control channel.

Herein, the priority of the reporting signaling is further set to meet any one of the foregoing, so that the priority of the reporting signaling is set more appropriately.

In this embodiment, in a case that the uplink LBT failure occurs in the at least one cell, if the terminal has an available uplink resource, for example, an uplink resource indicated by an uplink grant (Uplink grant), the terminal reports the failure information on the available uplink resource of the terminal, that is, step 101 may include: sending, on a first uplink resource, the failure information of the at least one cell to the network side based on the reporting signaling.

It should be noted that the first uplink resource may be any uplink resource that is configured by the network side and that can be used to report the failure information.

For example, in some implementations, the first uplink resource includes:
   an uplink resource of a cell other than the cell in which the uplink LBT failure occurs; or
   an uplink resource of a special cell in a same cell group to which the cell in which the uplink LBT failure occurs and the special cell are located.

Herein, the failure information is reported by using the uplink resource of a cell other than the cell in which the uplink LBT failure occurs, or the uplink resource of a special cell in a same cell group to which the cell in which the uplink LBT failure occurs and the special cell are located, thereby ensuring a reporting success rate.

Specifically, the special cell includes a PCell and a PSCell. For example, in a case that the uplink LBT failure occurs in an SCell of an SCG of the terminal, the terminal may send the failure information of the at least one cell to the network side based on the reporting signaling in the PSCell of the SCG.

In some implementations, in a case that the terminal is not configured with the first uplink resource, a first Scheduling Request (SR) is sent on a first SR resource, where the first SR resource is configured by the network side, and the first SR is used to request the network side to configure a second uplink resource for the terminal, so that in a case that the terminal is not configured with an available uplink resource for reporting the failure information, the terminal may request an uplink resource from the network side by reporting an SR.

In this implementation, that the network side configures the second uplink resource for the terminal may be that when the network side receives the first SR sent by the terminal, the network side sends uplink resource allocation information to the terminal. For example, the uplink resource allocation information may be indicated by using uplink grant information in Downlink Control Information (DCI), so that the second uplink resource is configured for the terminal by using the uplink resource allocation information.

In addition, the second uplink resource may be the first uplink resource, that is, the first SR resource may be an SR resource exclusively configured by the network side for the failure information. In this case, when the network side configures the second uplink resource for the terminal for the terminal, the terminal may send, on the second uplink resource, the failure information of the at least one cell to the network side based on the reporting signaling. Certainly, the second uplink resource may alternatively be another uplink resource except the first uplink resource, for example, the second uplink resource is an uplink resource used to send data other than the failure information.

In this implementation, that the terminal sends the first SR to the network side may be: triggering sending of the first SR according to a preset rule. Specifically, the first SR is sent when being triggered by an event that the uplink LBT failure occurs in a cell, or is sent when being triggered by information for reporting the uplink LBT failure.

Further, that the terminal sends the first SR to the network side may be that sending of the first SR can be triggered only by an uplink LBT failure event, but cannot be triggered by another event (for example, there is a logical channel on which uplink data arrives).

It should be noted that, in a process in which the terminal triggers sending of the first SR, the terminal may continuously send the first SR. In some implementations, the method may further include: in a case that the failure information is sent, skipping sending the first SR on the first SR resource, so that sending of the first SR can be stopped in a timely manner, thereby reducing resource waste of the terminal.

In addition, the sending the first SR on the first SR resource may be sending the first SR by using any SR resource in the first SR resource.

For example, in some implementations, the first SR resource includes a second SR resource of the cell in which the uplink LBT failure occurs.

The sending the first SR on the first SR resource includes:
sending the first SR on an SR resource in the first SR resource except the second SR resource.

Herein, the first SR is sent by using an SR resource except the second SR resource in the first SR resource, so that a success rate of sending the first SR can be improved.

It should be noted that in this embodiment, the network side device may not configure any SR resource for the terminal, or does not configure a specific SR resource for reporting the uplink LBT failure information. Therefore, in a case that the terminal does not receive the SR resource configured by the network side, the method further includes: triggering a random access process in a case that the terminal sends the reporting signaling, so that the terminal can continue the random access process.

In step 102, the terminal may send the failure information of the at least one cell to the network side based on the reporting signaling determined in step 101, and the network side may determine, based on the reporting information, the at least one cell in which the uplink LBT failure occurs, and restore the uplink LBT failure of the at least one cell, to improve data transmission efficiency.

In some implementations, after the determining the reporting signaling, the method further includes:
starting a retransmission timer in a case that the failure information is sent; and
resending the failure information in a case that the retransmission timer expires.

Herein, when the terminal sends the failure information of the at least one cell to the network side based on the reporting signaling, the terminal may start the retransmission timer, and when the retransmission timer expires, resend the failure information of the at least one cell to the network side based on the reporting signaling, so that a success rate of receiving the failure information by the network side can be improved.

It should be noted that the retransmission timer may be a timer associated with the reporting signaling, and in a case that the reporting signaling includes multiple pieces of first signaling, one timer is correspondingly disposed for each piece of first signaling, a retransmission timer corresponding to the first signaling is started in a case that failure information of a cell indicated by any piece of first signaling is sent base on the piece of first signaling, and when the retransmission timer corresponding to the first signaling expires, failure information indicating that the uplink LBT failure occurs in the cell indicated by the first information is resent.

In some implementations, after the starting a retransmission timer, the method further includes:
stopping the retransmission timer in a case that a stopping condition is met, where the stopping condition includes at least one of the following:
a cell indicated by the reporting signaling is deactivated or deleted; or
an acknowledgment indication sent by the network side is received, where the acknowledgment indication is used to indicate that the network side receives the failure information.

Herein, by the stopping condition for the retransmission timer is set, so that the retransmission timer can be stopped in a timely manner, thereby reducing resource waste of the terminal.

In this implementation, in a case that the cell indicated by the reporting signaling is deactivated or deleted, the terminal may stop the retransmission timer.

For example, in a case that the reporting signaling includes the first signaling, and the first signaling indicates a cell 1 and a cell 2 in which the uplink LBT failure occurs, if the cell 1 and the cell 2 are deactivated or deleted, the terminal stops a retransmission timer associated with the first signaling; or if the reporting signaling includes second signaling 1 and second signaling 2, the second signaling 1 indicates a cell 1 in which the uplink LBT failure occurs, and the second signaling 2 indicates a cell 2 in which the uplink LBT failure occurs, if the cell 1 is deactivated or deleted, the terminal stops a retransmission timer associated with the second signaling 1, and if the cell 2 is deactivated or deleted, the terminal stops a retransmission timer associated with the second signaling 2.

In addition, in some implementations, in a case that the stopping condition includes that the cell indicated by the reporting signaling is deactivated, the method further includes:

cancelling SR sending triggered by the uplink LBT failure, and/or cancelling sending of the failure information.

Herein, in a case that the cell indicated by the reporting signaling is deactivated, the terminal may cancel sending of the SR (for example, the first SR) in a timely manner, or cancel sending of the failure information, or cancel sending of the SR and sending of the failure information, so that the terminal can be prevented from continuously repeatedly sending the SR and the failure information, thereby further reducing resource waste of the terminal.

In this implementation, when receiving the failure information, the network side sends the acknowledgment indication to the terminal. After receiving the acknowledgment indication, the terminal may learn that the network side has received the failure information, and in this case, the terminal may also stop reporting the retransmission timer associated with the signaling.

In some implementations, the acknowledgment indication includes any one of the following:

a new transmission indication corresponding to a Hybrid Automatic Repeat reQuest (HARM) process for sending the failure information; and Radio Resource Control (RRC) layer signaling, Media Access Control (MAC) signaling, or Physical Downlink Control CHannel (PDCCH) signaling.

Herein, the network side may indicate, by using an implicit indication (that is, the new transmission indication), that the terminal has received the failure information, or may indicate, by using an explicit indication (that is, the RRC signaling, the MAC signaling, or the PDCCH signaling), that the terminal has received the failure information, so that a manner of sending the acknowledgment indication by the network side is more flexible.

In the embodiments of the present disclosure, reporting signaling is determined in a case that it is detected that an uplink LBT failure occurs on the terminal in at least one cell, and failure information of the at least one cell is sent to a network side based on the reporting signaling. In this way, in a case that the LBT failure occurs in the at least one cell, the terminal can quickly report the failure information to the network side, so that the network side can restore the uplink LBT failure in a timely manner, to prevent the terminal from continuously triggering a connection reestablishment process, thereby improving data transmission efficiency.

Figure 6:
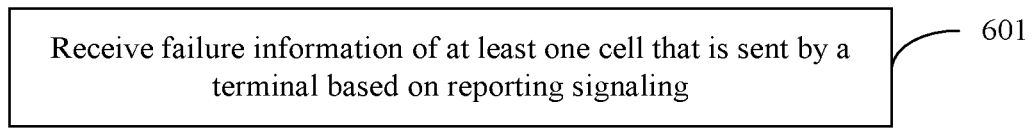
FIG. 6 is a second schematic flowchart of a method for reporting a failure report according to an embodiment of the present disclosure.

Referring to FIG. 6, an embodiment of the present disclosure provides another method for reporting a failure report, applied to a network side device. As shown in FIG. 6, the method for reporting a failure report includes the following steps:

Step 601: Receive failure information of at least one cell that is sent by a terminal based on reporting signaling.

In some embodiments, the reporting signaling includes first signaling or at least one piece of second signaling, where the first signaling is used to indicate at least one cell in which the uplink LBT failure occurs; and the second signaling is used to indicate one cell in which the uplink LBT failure occurs.

In some embodiments, the second signaling includes a serving cell identity or a secondary cell identity of a cell indicated by the second signaling.

In some embodiments, the first signaling includes a cell indicator used to indicate the at least one cell, where in a case that a quantity of secondary cells in the at least one cell is less than or equal to 7, a length of the cell indicator is one byte; or in a case that a quantity of cells of the at least two cells is greater than 7, a length of the cell indicator is 4 bytes.

In some embodiments, the reporting signaling includes BWP identification information of a first cell, the first cell is any one of the at least one cell, and the BWP identification information is used to indicate a BWP in the first cell on which the uplink LBT failure occurs.

In some embodiments, the BWP identification information is used to:

indicate all BWPs in the first cell on which the uplink LBT failure occurs; or indicate a BWP in the first cell on which the uplink LBT failure occurs for the last time; or indicate a BWP in the first cell on which the uplink LBT failure occurs for the first time.

In some embodiments, it is agreed on in a protocol that the uplink LBT failure occurs on an activated BWP of the first cell.

In some embodiments, a priority of the reporting signaling is higher than a priority of a data channel.

In some embodiments, the priority of the reporting signaling further meets any one of the following:

being the same as a priority of a C-RNTI MAC CE;

being lower than only a priority of a C-RNTI MAC CE; or being higher than only a priority of data from any logical channel other than an uplink common control channel.

In some embodiments, the receiving failure information of at least one cell that is sent by a terminal based on reporting signaling includes:

receiving the failure information of the at least one cell that is sent by the terminal on a first uplink resource based on the reporting signaling.

In some embodiments, the first uplink resource includes:

an uplink resource of a cell other than the cell in which the uplink LBT failure occurs; or an uplink resource of a special cell in a same cell group to which the cell in which the uplink LBT failure occurs and the special cell are located.

In some embodiments, the method further includes:

receiving a first SR sent by the terminal on a first SR resource, where the first SR resource is configured by the network side; and configuring a second uplink resource for the terminal in response to the first SR.

In some embodiments, the first SR is sent when triggered by an event that the uplink LBT failure occurs in a cell, or is sent when triggered by reporting of information of the uplink LBT failure.

In some embodiments, the first SR resource includes a second SR resource of the cell in which the uplink LBT failure occurs.

The receiving a first SR sent by the terminal on a first SR resource includes:
 receiving the first SR sent by the terminal on an SR resource in the first SR resource except the second SR resource.

In some embodiments, after the receiving failure information of at least one cell that is sent by a terminal based on reporting signaling, the method further includes:
 sending, to the terminal, an acknowledgment indication indicating that the failure information is received.

In some embodiments, the acknowledgment indication includes any one of the following:
 a new transmission indication corresponding to a HARQ process for sending the failure information; and
 RRC layer signaling, MAC signaling, or PDCCH signaling.

It should be noted that this embodiment is used as an implementation of the network side corresponding to the method embodiment in FIG. 2. Therefore, reference may be made to related descriptions in the foregoing method embodiment, and a same beneficial effect may be achieved. To avoid repetition of description, details are not described herein again.

Figure 7:
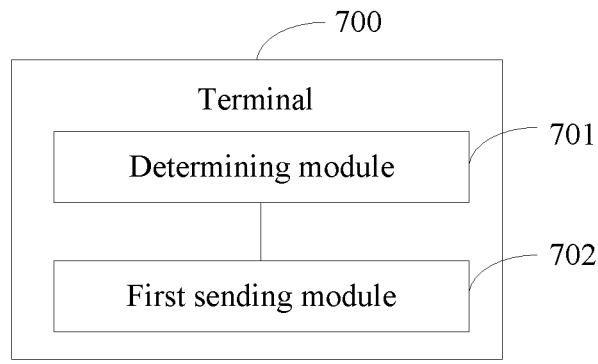
FIG. 7 is a first schematic diagram of a structure of a terminal according to an embodiment of the present disclosure.

Referring to FIG. 7, an embodiment of the present disclosure provides a terminal. As shown in FIG. 7, the terminal 700 includes:
 a determining module 701, configured to determine reporting signaling in a case that an uplink LBT failure occurs in at least one cell; and
 a first sending module 702, configured to send the failure information of the at least one cell to a network side based on the reporting signaling.

In some embodiments, the reporting signaling includes first signaling or at least one piece of second signaling, where
 the first signaling is used to indicate at least one cell in which the uplink LBT failure occurs; and
 the second signaling is used to indicate one cell in which the uplink LBT failure occurs.

In some embodiments, the second signaling includes a serving cell identity or a secondary cell identity of a cell indicated by the second signaling.

In some embodiments, the first signaling includes a cell indicator used to indicate the at least one cell, where
 in a case that a quantity of secondary cells in the at least one cell is less than or equal to 7, a length of the cell indicator is one byte; or
 in a case that a quantity of cells of the at least two cells is greater than 7, a length of the cell indicator is 4 bytes.

In some embodiments, the reporting signaling includes bandwidth part BWP identification information of a first cell, the first cell is any one of the at least one cell, and the BWP identification information is used to indicate a BWP in the first cell on which the uplink LBT failure occurs.

In some embodiments, the BWP identification information is used to:
 indicate all BWPs in the first cell on which the uplink LBT failure occurs; or
 indicate a BWP in the first cell on which the uplink LBT failure occurs for the last time; or
 indicate a BWP in the first cell on which the uplink LBT failure occurs for the first time.

In some embodiments, it is agreed on in a protocol that the uplink LBT failure occurs on an activated BWP of the first cell.

In some embodiments, a priority of the reporting signaling is higher than a priority of a data channel.

In some embodiments, the priority of the reporting signaling further meets any one of the following:
 being the same as a priority of a C-RNTI MAC CE;
 being lower than only a priority of a C-RNTI MAC CE; or
 being higher than only a priority of data from any logical channel other than an uplink common control channel.

In some embodiments, the first sending module 702 is specifically configured to:
 send, on a first uplink resource, the failure information of the at least one cell to the network side based on the reporting signaling.

In some embodiments, the first uplink resource includes:
 an uplink resource of a cell other than the cell in which the uplink LBT failure occurs; or
 an uplink resource of a special cell in a same cell group to which the cell in which the uplink LBT failure occurs and the special cell are located.

In some embodiments, the terminal 700 further includes:
 a second sending module, configured to: in a case that the terminal is not configured with the first uplink resource, send a first SR on a first SR resource, where the first SR resource is configured by the network side, and the first SR is used to request the network side to configure a second uplink resource for the terminal.

In some embodiments, the first SR is sent when triggered by an event that the uplink LBT failure occurs in a cell, or is sent when triggered by reporting of information of the uplink LBT failure.

In some embodiments, the terminal 700 further includes:
 a first processing module, configured to: in a case that the failure information is sent, skip sending the first SR on the first SR resource.

In some embodiments, the first SR resource includes a second SR resource of the cell in which the uplink LBT failure occurs.

The second sending module is specifically configured to:
 send the first SR on an SR resource in the first SR resource except the second SR resource.

In some embodiments, in a case that the terminal does not receive the SR resource configured by the network side, the terminal 700 further includes:
 a second processing module, configured to trigger a random access process in a case that the terminal sends the reporting signaling.

In some embodiments, the terminal 700 further includes:
 a timer starting module, configured to start a retransmission timer in a case that the failure information is sent; and
 a third sending module, configured to resend the failure information in a case that the retransmission timer expires.

In some embodiments, the terminal 700 further includes:
 a timer stopping module, configured to stop the retransmission timer in a case that a stopping condition is met, where the stopping condition includes at least one of the following:
 a cell indicated by the reporting signaling is deactivated or deleted; or an acknowledgment indication sent by the network side is received, where the acknowledgment indication is used to indicate that the network side receives the failure information.

In some embodiments, the acknowledgment indication includes any one of the following:
 a new transmission indication corresponding to a HARQ process for sending the failure information; and
 RRC layer signaling, MAC signaling, or PDCCH signaling.

In some embodiments, in a case that the stopping condition includes that the cell indicated by the reporting signaling is deactivated, the terminal 700 further includes:
 a third processing module, configured to cancel SR sending triggered by the uplink LBT failure, and/or cancel sending of the failure information.

It should be noted that the terminal 700 can implement each process in the method embodiment in FIG. 2 of the present disclosure and achieve a same beneficial effect. To avoid repetition, details are not described herein again.

Figure 8:
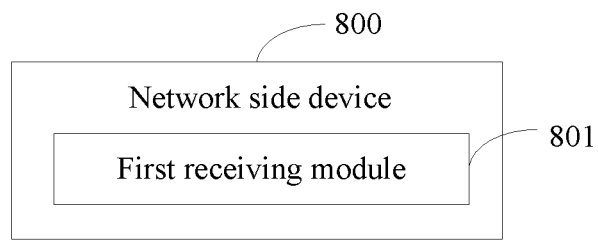
FIG. 8 is a first schematic diagram of a structure of a network side device according to an embodiment of the present disclosure.

Referring to FIG. 8, an embodiment of the present disclosure further provides a network side device. As shown in FIG. 8, the network side device 800 includes:
 a first receiving module 801, configured to receive failure information of at least one cell that is sent by a terminal based on reporting signaling.

In some embodiments, the reporting signaling includes first signaling or at least one piece of second signaling, where
 the first signaling is used to indicate at least one cell in which the uplink LBT failure occurs; and
 the second signaling is used to indicate one cell in which the uplink LBT failure occurs.

In some embodiments, the second signaling includes a serving cell identity or a secondary cell identity of a cell indicated by the second signaling.

In some embodiments, the first signaling includes a cell indicator used to indicate the at least one cell, where
 in a case that a quantity of secondary cells in the at least one cell is less than or equal to 7, a length of the cell indicator is one byte; or
 in a case that a quantity of cells of the at least two cells is greater than 7, a length of the cell indicator is 4 bytes.

In some embodiments, the reporting signaling includes bandwidth part BWP identification information of a first cell, the first cell is any one of the at least one cell, and the BWP identification information is used to indicate a BWP in the first cell on which the uplink LBT failure occurs.

In some embodiments, the BWP identification information is used to:
 indicate all BWPs in the first cell on which the uplink LBT failure occurs; or
 indicate a BWP in the first cell on which the uplink LBT failure occurs for the last time; or
 indicate a BWP in the first cell on which the uplink LBT failure occurs for the first time.

In some embodiments, it is agreed on in a protocol that the uplink LBT failure occurs on an activated BWP of the first cell.

In some embodiments, a priority of the reporting signaling is higher than a priority of a data channel.

In some embodiments, the priority of the reporting signaling further meets any one of the following:
 being the same as a priority of a C-RNTI MAC CE;
 being lower than only a priority of a C-RNTI MAC CE; or
 being higher than only a priority of data from any logical channel other than an uplink common control channel.

In some embodiments, the first receiving module 801 is further configured to:
 receive the failure information of the at least one cell that is sent by the terminal on a first uplink resource based on the reporting signaling.

In some embodiments, the first uplink resource includes:
 an uplink resource of a cell other than the cell in which the uplink LBT failure occurs; or
 an uplink resource of a special cell in a same cell group to which the cell in which the uplink LBT failure occurs and the special cell are located.

In some embodiments, the network side device 800 further includes:
 a second receiving module, configured to receive a first SR sent by the terminal on a first SR resource, where the first SR resource is configured by the network side; and
 a resource configuration module, configured to configure a second uplink resource for the terminal in response to the first SR.

In some embodiments, the first SR is sent when triggered by an event that the uplink LBT failure occurs in a cell, or is sent when triggered by reporting of information of the uplink LBT failure.

In some embodiments, the first SR resource includes a second SR resource of the cell in which the uplink LBT failure occurs.

The second receiving module is specifically configured to:
 receive the first SR sent by the terminal on an SR resource in the first SR resource except the second SR resource.

In some embodiments, the network side device 800 further includes:
 a sending module, configured to send, to the terminal, an acknowledgment indication indicating that the failure information is received.

In some embodiments, the acknowledgment indication includes any one of the following:
 a new transmission indication corresponding to a HARQ process for sending the failure information; and
 RRC layer signaling, MAC signaling, or PDCCH signaling.

It should be noted that the network side device 800 can implement each process in the method embodiment in FIG. 6 of the present disclosure and achieve a same beneficial effect. To avoid repetition, details are not described herein again.

Figure 9:
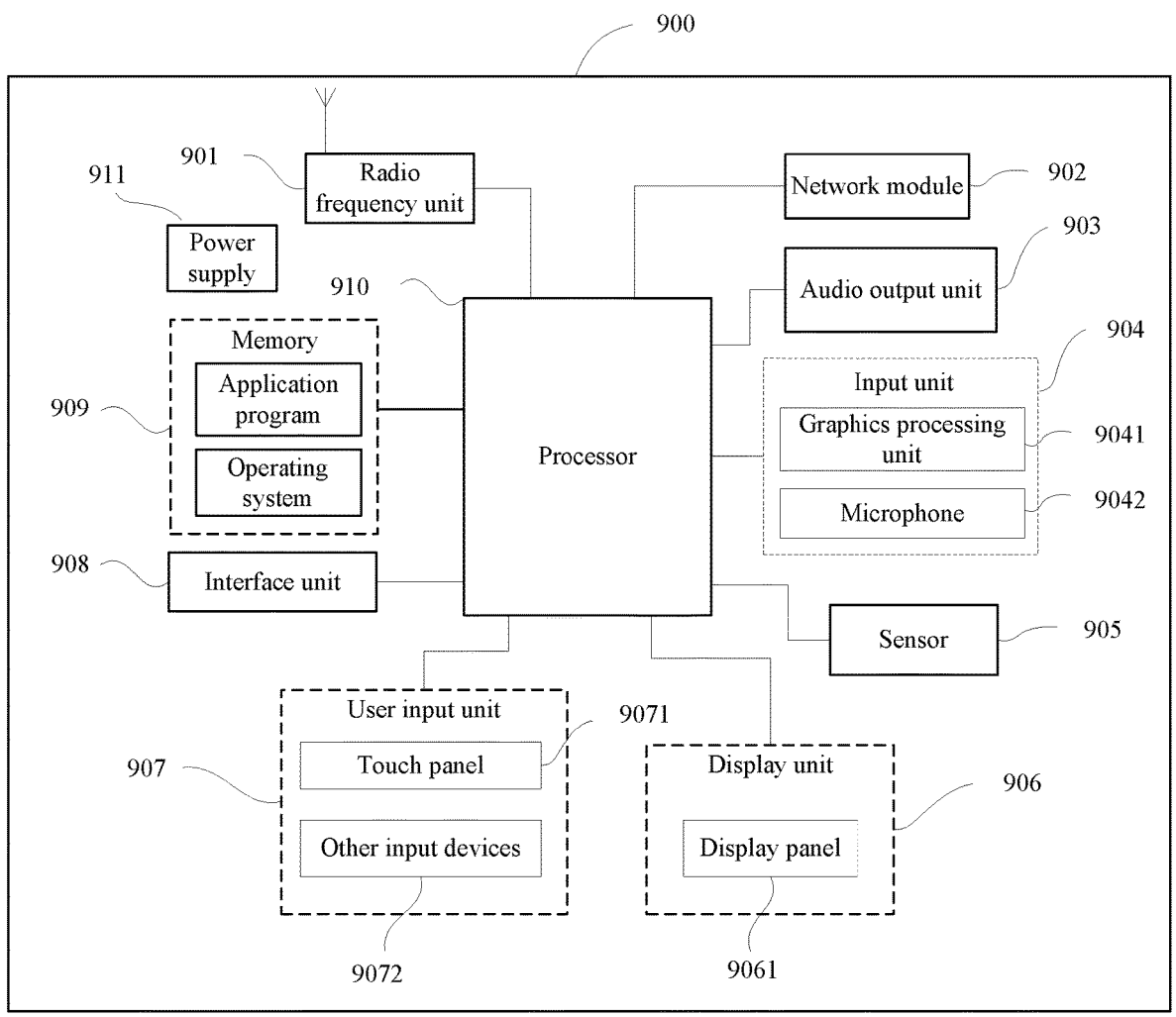
FIG. 9 is a second schematic diagram of a structure of a terminal according to an embodiment of the present disclosure.

Referring to FIG. 9, an embodiment of the present disclosure provides a terminal. As shown in FIG. 9, a terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that a structure of the terminal shown in FIG. 9 does not constitute a limitation on the terminal, and the terminal may include more or fewer components than those shown in the figure, or combine some components, or have different component arrangements. In this embodiment of the present disclosure, the terminal 900 includes but is not limited to a mobile phone, a tablet computer, a laptop computer, a palmtop computer, an in-vehicle terminal, a wearable device, a pedometer, and the like.

The processor 910 is configured to:
determine reporting signaling in a case that an uplink listen-before-talk LBT failure occurs on the terminal in at least one cell.

The radio frequency unit 901 is configured to:
send failure information of the at least one cell to a network side based on the reporting signaling.

In some embodiments, the reporting signaling includes first signaling or at least one piece of second signaling, where
the first signaling is used to indicate at least one cell in which the uplink LBT failure occurs; and
the second signaling is used to indicate one cell in which the uplink LBT failure occurs.

In some embodiments, the second signaling includes a serving cell identity or a secondary cell identity of a cell indicated by the second signaling.

In some embodiments, the first signaling includes a cell indicator used to indicate the at least one cell, where
in a case that a quantity of secondary cells in the at least one cell is less than or equal to 7, a length of the cell indicator is one byte; or
in a case that a quantity of cells of the at least two cells is greater than 7, a length of the cell indicator is 4 bytes.

In some embodiments, the reporting signaling includes BWP identification information of a first cell, the first cell is any one of the at least one cell, and the BWP identification information is used to indicate a BWP in the first cell on which the uplink LBT failure occurs.

In some embodiments, the BWP identification information is used to:
indicate all BWPs in the first cell on which the uplink LBT failure occurs; or
indicate a BWP in the first cell on which the uplink LBT failure occurs for the last time; or
indicate a BWP in the first cell on which the uplink LBT failure occurs for the first time.

In some embodiments, it is agreed on in a protocol that the uplink LBT failure occurs on an activated BWP of the first cell.

In some embodiments, a priority of the reporting signaling is higher than a priority of a data channel.

In some embodiments, the priority of the reporting signaling further meets any one of the following:
being the same as a priority of a C-RNTI MAC CE;
being lower than only a priority of a C-RNTI MAC CE; or
being higher than only a priority of data from any logical channel other than an uplink common control channel.

In some embodiments, the radio frequency unit 901 is specifically configured to:
send, on a first uplink resource, the failure information of the at least one cell to the network side based on the reporting signaling.

In some embodiments, the first uplink resource includes:
an uplink resource of a cell other than the cell in which the uplink LBT failure occurs; or
an uplink resource of a special cell in a same cell group to which the cell in which the uplink LBT failure occurs and the special cell are located.

In some embodiments, the radio frequency unit 901 is further configured to:
in a case that the terminal is not configured with the first uplink resource, send a first SR on a first SR resource, where the first SR resource is configured by the network side, and the first SR is used to request the network side to configure a second uplink resource for the terminal.

In some embodiments, the first SR is sent when triggered by an event that the uplink LBT failure occurs in a cell, or is sent when triggered by reporting of information of the uplink LBT failure.

In some embodiments, the processor 910 is further configured to:
in a case that the failure information is sent, skip sending the first SR on the first SR resource.

In some embodiments, the first SR resource includes a second SR resource of the cell in which the uplink LBT failure occurs.

The radio frequency unit 901 is specifically configured to:
send the first SR on an SR resource in the first SR resource except the second SR resource.

In some embodiments, the processor 910 is further configured to:
trigger a random access process in a case that the terminal sends the reporting signaling.

In some embodiments, the processor 910 is further configured to:
start a retransmission timer in a case that the failure information is sent.

The radio frequency unit 901 is further configured to:
resend the failure information in a case that the retransmission timer expires.

In some embodiments, the processor 910 is further configured to:
stop the retransmission timer in a case that a stopping condition is met, where the stopping condition includes at least one of the following:
a cell indicated by the reporting signaling is deactivated or deleted; or
an acknowledgment indication sent by the network side is received, where the acknowledgment indication is used to indicate that the network side receives the failure information.

In some embodiments, the acknowledgment indication includes any one of the following:
a new transmission indication corresponding to a HARQ process for sending the failure information; and
RRC layer signaling, MAC signaling, or PDCCH signaling.

In some embodiments, in a case that the stopping condition includes that the cell indicated by the reporting signaling is deactivated, the processor 910 is further configured to:
cancel SR sending triggered by the uplink LBT failure, and/or cancel sending of the failure information.

It should be noted that the terminal 900 in this embodiment can implement each process implemented by the terminal in the method embodiment of FIG. 2 in the embodiments of the present disclosure, and achieve a same technical effect. To avoid repetition, details are not described herein again.

It should be understood that, in this embodiment of the present disclosure, the radio frequency unit 901 may be configured to receive and send information or receive and send a signal in a call process. Specifically, after downlink data from a base station is received, the processor 910 processes the downlink data. In addition, uplink data is sent to the base station. Generally, the radio frequency unit 901 includes but is not limited to an antenna, at least one amplifier, a transceiver, a coupler, a low noise amplifier, a duplexer, and the like. In addition, the radio frequency unit 901 may further communicate with a network and another device by using a wireless communication system.

The terminal provides wireless broadband Internet access for a user by using a network module 902, for example, helping the user send and receive an email, browsing a web page, and accessing streaming media.

The audio output unit 903 may convert audio data received by the radio frequency unit 901 or the network module 902 or stored in the memory 909 into an audio signal and output as sound. In addition, the audio output unit 903 may further provide audio output (for example, call signal receiving sound or message receiving sound) related to a specific function performed by the terminal 900. The audio output unit 903 includes a loudspeaker, a buzzer, a telephone receiver, and the like.

The input unit 904 is configured to receive an audio or video signal. The input unit 904 may include a Graphics Processing Unit (GPU) 9041 and a microphone 9042. The graphics processing unit 9041 processes image data of a static picture or a video obtained by an image capture apparatus (such as a camera) in a video capture mode or an image capture mode. A processed image frame may be displayed on the display unit 906. The image frame processed by the graphics processing unit 9041 may be stored in the memory 909 (or another storage medium) or sent by using the radio frequency unit 901 or the network module 902. The microphone 9042 may receive sound and can process such sound into audio data. The processed audio data may be output by being converted into a format that may be sent to a mobile communications base station by using the radio frequency unit 901 in a telephone call mode.

The terminal 900 further includes at least one sensor 905, such as an optical sensor, a motion sensor, and another sensor. Specifically, the optical sensor includes an ambient light sensor and a proximity sensor. The ambient light sensor may adjust luminance of the display panel 9061 based on brightness of ambient light, and the proximity sensor may disable the display panel 9061 and/or backlight when the terminal 900 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 905 may further include a fingerprint sensor, a pressure sensor, an iris sensor, a molecular sensor, a gyroscope, a barometer, a hygrometer, a thermometer, an infrared sensor, and the like. This is not described herein.

The display unit 906 is configured to display information entered by the user or information provided for the user. The display unit 906 may include a display panel 9061, and the display panel 9061 may be configured in a form of a Liquid Crystal Display (LCD), an Organic Light-Emitting Diode (OLED), or the like.

The user input unit 907 may be configured to receive input digit or character information and generate key signal input related to user setting and function control of a terminal. Specifically, the user input unit 907 includes a touch panel 9071 and another input device 9072. The touch panel 9071, also referred to as a touchscreen, may collect a touch operation performed by the user on or near the touch panel 9071 (for example, an operation performed by the user on or near the touch panel 9071 by using any suitable object or accessory such as a finger or a stylus). The touch panel 9071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 910, and can receive and execute a command sent by the processor 910. In addition, the touch panel 9071 may be implemented by using a plurality of types such as a resistive type, a capacitive type, an infrared ray, and a surface acoustic wave. The user input unit 907 may include another input device 9072 in addition to the touch panel 9071. Specifically, the another input device 9072 may include but is not limited to one or more of a physical keyboard, a function key (such as a volume control key or an on/off key), a trackball, a mouse, a joystick, and the like. Details are not described herein.

Further, the touch panel 9071 may cover the display panel 9061. After detecting the touch operation on or near the touch panel 9071, the touch panel 9061 transmits the touch operation to the processor 910 to determine a type of a touch event, and then the processor 910 provides corresponding visual output on the display panel 9061 based on the type of the touch event. In FIG. 9, the touch panel 9071 and the display panel 9061 are used as two independent components to implement input and output functions of the terminal. However, in some embodiments, the touch panel 9071 and the display panel 9061 may be integrated to implement the input and output functions of the terminal. This is not specifically limited herein.

The interface unit 908 is an interface connecting an external apparatus to the terminal 900. For example, the external apparatus may include a wired or wireless headset port, an external power supply (or battery charger) port, a wired or wireless data port, a storage card port, a port configured to connect to an apparatus having an identification module, an audio Input/Output (I/O) port, a video I/O port, a headset port, and the like. The interface unit 908 may be configured to receive input (for example, data information and power) from the external apparatus and transmit the received input to one or more elements in the terminal 900, or may be configured to transmit data between the terminal 900 and the external apparatus.

The memory 909 may be configured to store a software program and various data. The memory 909 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 909 may include a high-speed random access memory, and may further include a non-volatile memory such as at least one magnetic disk storage component, a flash memory component, or another volatile solid-state storage component.

The processor 910 is a control center of the terminal, and is connected to all parts of the entire terminal by using various interfaces and lines, and performs various functions of the terminal and processes data by running or executing the software program and/or the module that are stored in the memory 909 and invoking the data stored in the memory 909, to implement overall monitoring on the terminal. The processor 910 may include one or more processing units. Preferentially, the processor 910 may be integrated with an application processor and a modem processor. The application processor mainly processes an operating system, a user interface, an application program, and the like, and the modem processor mainly processes wireless communication. It may be understood that the modem processor may alternatively not be integrated into the processor 910.

The terminal 900 may further include a power supply 911 (such as a battery) that supplies power to each component. Preferentially, the power supply 911 may be logically connected to the processor 910 by using a power management system, to implement functions such as charging, discharging, and power consumption management by using the power management system.

In addition, the terminal 900 includes some function modules not shown, and details are not described herein.

Preferentially, an embodiment of the present disclosure further provides a terminal, including a processor 910, a memory 909, and a computer program that is stored in the memory 909 and that can run on the processor 910. When the computer program is executed by the processor 910, each process implemented by the terminal in the foregoing embodiments can be implemented, and a same technical effect can be achieved. To avoid repetition, details are not described herein.

Figure 10:
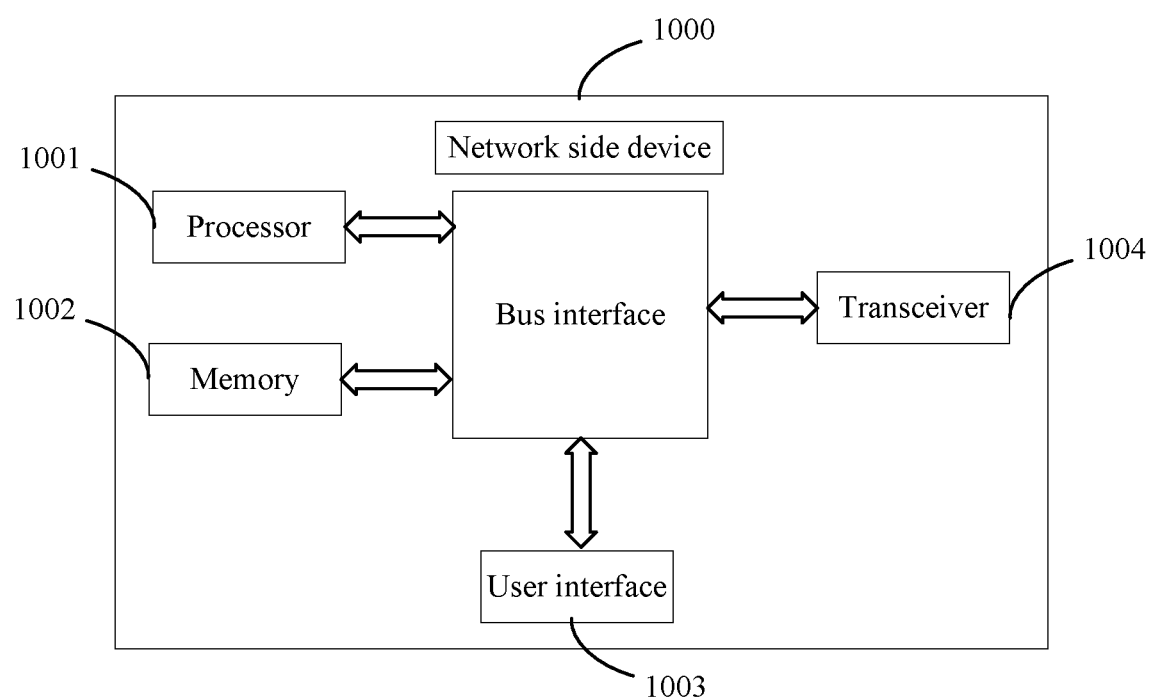
FIG. 10 is a second schematic diagram of a structure of a network side device according to an embodiment of the present disclosure.

As shown in FIG. 10, an embodiment of the present disclosure provides a network side device. As shown in FIG. 10, a network side device 1000 includes a processor 1001, a memory 1002, a user interface 1003, a transceiver 1004, and a bus interface.

In this embodiment of the present disclosure, the network side device 1000 further includes a computer program that is stored in the memory 1002 and that can run on the processor 1001. When the computer program is executed by the processor 1001, the following step is implemented:
receiving, by using the transceiver 1004, failure information of at least one cell that is sent by the terminal based on reporting signaling.

In FIG. 10, a bus architecture may include any quantity of interconnected buses and bridges, and is specifically linked by various circuits of one or more processors represented by the processor 1001 and a memory represented by the memory 1002. The bus architecture may further link various other circuits such as a peripheral device, a voltage regulator, and a power management circuit together. These are all well-known in the art, and therefore are not further described in this specification. The bus interface provides interfaces. The transceiver 1004 may be a plurality of elements, in other words, includes a transmitter and a receiver, and provides a unit configured to communicate with various other apparatuses on a transmission medium. For different user equipment, the user interface 1003 may further be an interface that can be externally or internally connected to a required device. The connected device includes but is not limited to a keypad, a display, a loudspeaker, a microphone, a joystick, and the like.

The processor 1001 is responsible for managing the bus architecture and common processing, and the memory 1002 may store data used when the processor 1001 performs an operation.

In some embodiments, the reporting signaling includes first signaling or at least one piece of second signaling, where
the first signaling is used to indicate at least one cell in which the uplink LBT failure occurs; and
the second signaling is used to indicate one cell in which the uplink LBT failure occurs.

In some embodiments, the second signaling includes a serving cell identity or a secondary cell identity of a cell indicated by the second signaling.

In some embodiments, the first signaling includes a cell indicator used to indicate the at least one cell, where
in a case that a quantity of secondary cells in the at least one cell is less than or equal to 7, a length of the cell indicator is one byte; or
in a case that a quantity of cells of the at least two cells is greater than 7, a length of the cell indicator is 4 bytes.

In some embodiments, the reporting signaling includes BWP identification information of a first cell, the first cell is any one of the at least one cell, and the BWP identification information is used to indicate a BWP in the first cell on which the uplink LBT failure occurs.

In some embodiments, the BWP identification information is used to:
indicate all BWPs in the first cell on which the uplink LBT failure occurs; or
indicate a BWP in the first cell on which the uplink LBT failure occurs for the last time; or
indicate a BWP in the first cell on which the uplink LBT failure occurs for the first time.

In some embodiments, it is agreed on in a protocol that the uplink LBT failure occurs on an activated BWP of the first cell.

In some embodiments, a priority of the reporting signaling is higher than a priority of a data channel.

In some embodiments, the priority of the reporting signaling further meets any one of the following:
being the same as a priority of a C-RNTI MAC CE;
being lower than only a priority of a C-RNTI MAC CE; or
being higher than only a priority of data from any logical channel other than an uplink common control channel.

In some embodiments, the transceiver 1004 is specifically configured to:
receive the failure information of the at least one cell that is sent by the terminal on a first uplink resource based on the reporting signaling.

In some embodiments, the first uplink resource includes:
an uplink resource of a cell other than the cell in which the uplink LBT failure occurs; or
an uplink resource of a special cell in a same cell group to which the cell in which the uplink LBT failure occurs and the special cell are located.

In some embodiments, the transceiver 1004 is further configured to:
receive a first SR sent by the terminal on a first SR resource, where the first SR resource is configured by the network side; and
configure a second uplink resource for the terminal in response to the first SR.

In some embodiments, the first SR is sent when triggered by an event that the uplink LBT failure occurs in a cell, or is sent when triggered by reporting of information of the uplink LBT failure.

In some embodiments, the first SR resource includes a second SR resource of the cell in which the uplink LBT failure occurs.

The transceiver 1004 is further specifically configured to:
receive the first SR sent by the terminal on an SR resource in the first SR resource except the second SR resource.

In some embodiments, the transceiver 1004 is further configured to:
send, to the terminal, an acknowledgment indication indicating that the failure information is received.

In some embodiments, the acknowledgment indication includes any one of the following:
- a new transmission indication corresponding to a HARQ process for sending the failure information; and
- RRC layer signaling, MAC signaling, or PDCCH signaling.

The network side device 1000 can implement processes implemented by the network side device in the foregoing method embodiments. To avoid repetition, details are not described herein again.

An embodiment of the present disclosure further provides a computer-readable storage medium. A computer program is stored in the computer-readable storage medium. When being executed by a processor, processes of the foregoing monitoring method embodiments can be implemented, and a same technical effect can be achieved. To avoid repetition, details are not described herein. The computer-readable storage medium includes a Read-only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A method for reporting a failure report, performed by a terminal, comprising:
   determining reporting signaling when an uplink Listen-Before-Talk (LBT) failure occurs on the terminal in at least one cell of a plurality of second cells, wherein the reporting signal comprises first signaling or at least one piece of second signal, wherein the first signaling comprises a cell indicator to indicate the at least one cell in which the uplink LBT failure occurs, wherein
   in a case that a quantity of the at least one cell of the plurality of secondary cells is less than or equal to 7, a length of a Medium Access Control (MAC) Control Element (CE) in the first signaling is one byte; or
   in a case that a quantity of the at least one cell of the plurality of secondary cells is greater than 7, a length of the MAC CE in the first signaling is 4 bytes; and
   sending failure information of the at least one cell to a network side based on the reporting signaling.

2. The method according to claim 1, wherein the second signaling is used to indicate one cell in which the uplink LBT failure occurs.

3. The method according to claim 2, wherein the second signaling comprises a serving cell identity or a secondary cell identity of the cell indicated by the second signaling.

4. The method according to claim 1, wherein the sending failure information of the at least one cell to a network side based on the reporting signaling comprises:
   sending, on a first uplink resource, the failure information of the at least one cell to the network side based on the reporting signaling.

5. The method according to claim 4, wherein the first uplink resource comprises:
   an uplink resource of a cell other than the cell in which the uplink LBT failure occurs; or
   an uplink resource of a special cell in a same cell group to which the cell in which the uplink LBT failure occurs and the special cell are located.

6. The method according to claim 1, further comprising:
   when that the terminal is not configured with the first uplink resource, sending a first Scheduling Request (SR) on a first SR resource, wherein the first SR resource is configured by the network side, and the first SR is used to request the network side to configure a second uplink resource for the terminal.

7. The method according to claim 6, wherein the first SR is sent when being triggered by an event that the uplink LBT failure occurs in a cell, or is sent when being triggered by reporting of information about the uplink LBT failure.

8. The method according to claim 6, further comprising:
   when the failure information is sent, skipping sending the first SR on the first SR resource.

9. The method according to claim 6, wherein the first SR resource comprises a second SR resource of the cell in which the uplink LBT failure occurs and another SR resource other than the second SR resource; and
   the sending a first SR on a first SR resource comprises:
   sending the first SR on the another SR resource.

10. The method according to claim 6, wherein when the terminal does not receive the SR resource configured by the network side, the method further comprises:
    triggering a random access process when the terminal sends the reporting signaling.

11. The method according to claim 1, wherein after the determining reporting signaling, the method further comprises:
    starting a retransmission timer in a case that the failure information is sent; and
    resending the failure information in a case that the retransmission timer expires.

12. The method according to claim 11, wherein after the starting a retransmission timer, the method further comprises:
    stopping the retransmission timer in a case that a stopping condition is met, wherein the stopping condition comprises at least one of the following:

a cell indicated by the reporting signaling is deactivated or deleted; or an acknowledgment indication sent by the network side is received, wherein the acknowledgment indication is used to indicate that the network side receives the failure information.

13. The method according to claim 12, wherein the acknowledgment indication further comprises any one of the following:

a new transmission indication corresponding to a Hybrid Automatic Repeat reQuest (HARQ) process for sending the failure information; and Radio Resource Control (RRC) layer signaling, Media Access Control (MAC) signaling, or Physical Downlink Control CHannel (PDCCH) signaling.

14. The method according to claim 12, wherein in a case that the stopping condition comprises that the cell indicated by the reporting signaling is deactivated, the method further comprises:

cancelling SR sending triggered by the uplink LBT failure, or cancelling sending of the failure information.

15. A method for reporting a failure report, performed by a network side device, comprising:

receiving failure information of at least one cell that is sent by a terminal based on reporting signaling, wherein the reporting signaling is determined by the terminal when an uplink Listen-Before-Talk (LBT) failure occurs on the terminal in at least one cell of a plurality of second cells, wherein the reporting signal comprises first signaling or at least one piece of second signal, wherein the first signaling comprises a cell indicator to indicate the at least one cell in which the uplink LBT failure occurs, wherein in a case that a quantity of the at least one cell of the plurality of secondary cells is less than or equal to 7, a length of a Medium Access Control (MAC) Control Element (CE) in the first signaling is one byte; or in a case that a quantity of the at least one cell of the plurality of secondary cells is greater than 7, a length of the MAC CE in the first signaling is 4 bytes.

16. The method according to claim 15, wherein the receiving failure information of at least one cell that is sent by a terminal based on reporting signaling comprises:

receiving the failure information of the at least one cell that is sent by the terminal on a first uplink resource based on the reporting signaling.

17. The method according to claim 15, wherein the method further comprises:

receiving a first Scheduling Request (SR) sent by the terminal on a first SR resource, wherein the first SR resource is configured by the network side; and configuring a second uplink resource for the terminal in response to the first SR.

18. The method according to claim 17, wherein the first SR resource comprises a second SR resource of the cell in which the uplink LBT failure occurs and another SR resource other than the second SR resource; and the receiving a first SR sent by the terminal on a first SR resource comprises:

receiving the first SR sent by the terminal on the other SR resource.

19. A terminal, comprising: a processor, a memory, and a computer program stored in the memory and capable of running on the processor, wherein the computer program, when executed by the processor, causes the processor to perform a method for reporting a failure report, wherein the method comprises;

determining reporting signaling when an uplink Listen-Before-Talk (LBT) failure occurs on the terminal in at least one cell of a plurality of second cells, wherein the reporting signal comprises first signaling or at least one piece of second signal, wherein the first signaling comprises a cell indicator to indicate the at least one cell in which the uplink LBT failure occurs, wherein in a case that a quantity of the at least one cell of the plurality of secondary cells is less than or equal to 7, a length of a Medium Access Control (MAC) Control Element (CE) in the first signaling is one byte; or in a case that a quantity of the at least one cell of the plurality of secondary cells is greater than 7, a length of the MAC CE in the first signaling is 4 bytes; and sending failure information of the at least one cell to a network side based on the reporting signaling.

* * * * *